(No Model.)

W. M. HARRIS.
LEMON SQUEEZER.

No. 468,341. Patented Feb. 9, 1892.

Witnesses:
Edwin L. Bradford
F. K. Cornwall

Inventor:
Walter M. Harris
By S. M. Smith & Son
Attorneys.

UNITED STATES PATENT OFFICE.

WALTER M. HARRIS, OF AUBURN, NEW YORK, ASSIGNOR TO MARIA F. HARRIS AND DAVID HARRIS, OF SAME PLACE.

LEMON-SQUEEZER.

SPECIFICATION forming part of Letters Patent No. 468,341, dated February 9, 1892.

Application filed July 9, 1891. Serial No. 398,935. (No model.)

*To all whom it may concern:*

Be it known that I, WALTER M. HARRIS, a citizen of the United States, and a resident of Auburn, county of Cayuga, and State of New York, have invented a new and useful Improvement in Lemon-Squeezers, of which the following is a full, clear, and exact description, reference being had to the accompanying drawings, making part of this specification.

My invention relates to an improvement in fruit or lemon squeezers; and its object is to produce an article simple and durable in construction, inexpensive in manufacture, and which will quickly and thoroughly separate the juice from the rind and pulp.

My invention consists in the combination of two levers having a common pivotal joint, each provided with a pocket or cup and one of them with a strainer and also formed with a juice-cup having a discharge-spout below and independent of said strainer, as hereinafter described and claimed.

Figure 1:
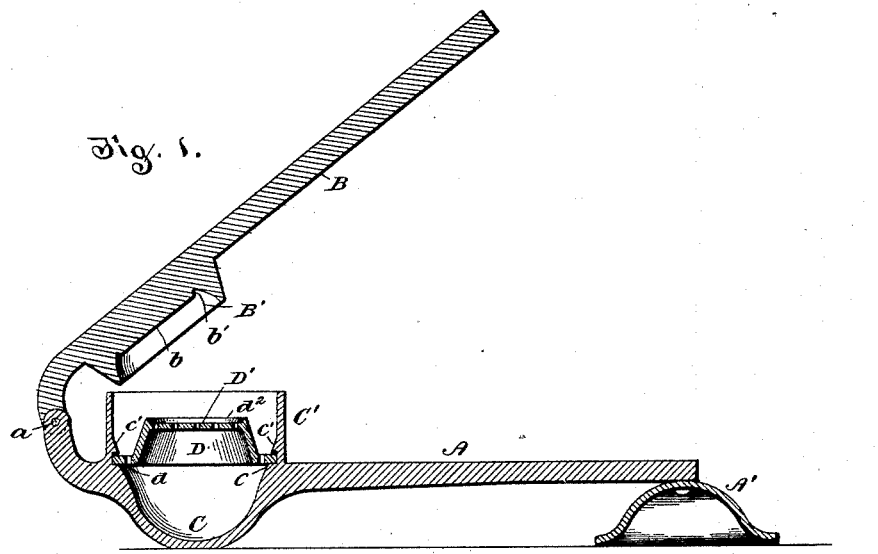
Figure 2:
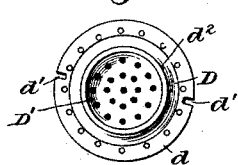
Figure 3:
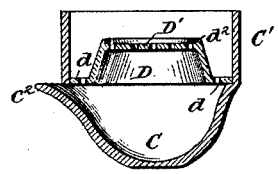
Figure 4:
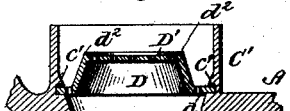
Figure 5:
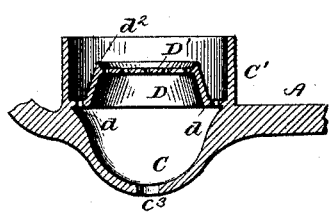
Figure 6:
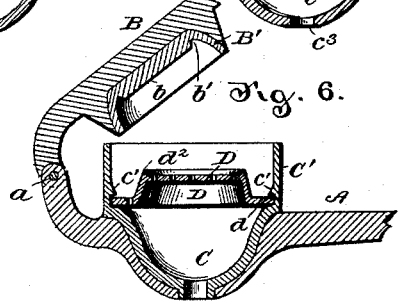
Figure 7:
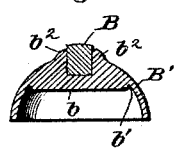
Figure 8:

In the accompanying drawings, Figure 1 represents a vertical longitudinal section through the improved squeezer. Fig. 2 is a plan view of the strainer detached. Fig. 3 is a vertical section through the holder-cup, strainer, and juice-cup, taken at right angles to Fig. 1 and showing the spout of the juice-cup. Fig. 4 is a vertical section showing a discharge-outlet in the bottom of the juice-cup. Fig. 5 is a vertical section showing the strainer formed in one piece with the holder and juice-cups. Fig. 6 is a vertical section similar to Fig. 1, showing removable non-corrosive cups and strainer. Fig. 7 is a cross-section through the upper handle or lever of Fig. 6, showing the manner of attaching the cup; and Fig. 8 is a cross-section through the lower lever of Fig. 6, showing the receptacle for the removable pitcher-spout cup.

A indicates the lower jaw and handle of the squeezer, provided at its handle end with a bell-shaped support $A'$, which serves to uphold said handle on a suitable support in horizontal position, and B is the upper jaw or handle, the two being pivotally connected at their heel ends by a through bolt or pin $a$. The jaw A is provided near its pivoted end with a cup-shaped depression extending below the handle, forming the juice-cup, and with a cylindrical extension or ring $C'$ above said handle, forming the holder or receptacle for the fruit to be operated upon. This cylindrical upper cup is of slightly greater diameter than the open mouth of the bowl or cup C, leaving a narrow annular ledge $c$ at its base, on which the strainer D rests. This strainer is in the form of a frustum of a cone, having a perforated annular flange $d$ on the periphery of its lower larger end, notched at $d'$ to permit it to pass ratchet-tooth-shaped lugs $c'$, underneath which the strainer is rotated far enough to take the notches $d'$ away from the lugs $c'$, and so prevent accidental displacement of the strainer. The upper smaller end of this strainer is provided with a flat perforated diaphragm $D'$, which forms also the lower die of the squeezer, and is placed slightly below the upper edge of the conical shell of the strainer, the upwardly-projecting rim $d^2$ thus formed being preferably beveled outward to an edge, outside of which the rind passes, thereby preventing the spurting outward of the juice.

The upper handle B has a pendent inverted cup $B'$ applied to or formed upon it, overlying the receptacle $C'$ and strainer D and forming the upper die, the base $b$ of the cup-shaped depression therein being made flat and provided with an annular groove $b'$, matching the rim $d^2$ and extending around said flat base.

The juice-cup C is provided on one side with a pitcher-spout $c^2$, extending underneath and outside of the rim $C'$, as shown in Fig. 3, facilitating the discharge of the contents of said cup and obviating the necessity for inverting the squeezer and compelling the juice to pass back through the strainer to be discharged.

In the construction described and represented in Figs. 1, 3, and 4 the strainer only is formed separate from the levers, as explained, and the latter are formed or cast with their respective cups each in a single piece, making a simple, strong, durable, and inexpensive construction and one not liable to get out of order.

In Fig. 5 the strainer D is shown as formed or cast also integral with the lower lever and its fruit-receptacle and juice-cup; but the construction first described is preferred, as by the removal of the strainer its thorough cleansing after use is facilitated.

In Fig. 4 the juice-cup C is shown provided with a discharge-outlet $c^3$ in its bottom, which may be used in lieu of or in addition to the spout.

Figs. 6, 7, and 8 are designed to represent the several cups when made separate from the handles or levers and formed from vitreous or other non-corrosive material. In this case the jaw portions of the levers are provided with suitable pockets for the cups fitting therein, as shown.

In Fig. 7 the upper face of the cup B' is bifurcated at $b^2$ to stride and engage the lever B, as indicated, and thereby prevent lateral movement or displacement of the cup, and in Fig. 8 the pocket is shown with an opening $c^4$ at one side to accommodate the pitcher-spout of the vitreous or non-corrosive cup fitting therein.

Further description of the operation of the squeezer is unnecessary, as the operation of the several parts will be readily understood.

Having thus described my invention, what I claim as new, and desire to secure by Letters Patent, is—

1. In a fruit-squeezer, an upper lever and its die, in combination with the lower lever provided with a fruit cup or receptacle, a juice-cup located below and formed integral with said receptacle, and an interposed strainer, and a discharge spout or outlet located above said juice-cup and beneath the strainer, substantially as and for the purpose described.

2. The combination, in a fruit-squeezer, of the lower jaw or lever A, provided with the juice-cup C, a pitcher-spout $c^2$, located at the side of said juice-cup and below the fruit-receptacle, the fruit-receptacle C' above said juice-cup and formed integral therewith, the interposed strainer, and the upper jaw B, provided with the inverted cup or cup-shaped die, substantially as described.

3. The combination, in a fruit-squeezer, of the lower jaw or handle A, the juice-cup and fruit-receptacle formed integral therewith, one below and the other above the upper face of said handle, the interposed strainer forming the lower die, and the upper handle B, provided with the inverted-cup-shaped die having the flat base and the annular groove $b'$, surrounding said base and matching a projecting rim on the strainer, all substantially as described.

4. The removable strainer provided with the notched rim, in combination with the fruit-receptacle provided with the lugs $c'$ for engaging said rim and preventing accidental displacement of the strainer, and the juice-cup formed integral with said receptacle and having the discharge-spout located below said strainer, substantially as described.

In testimony whereof I have hereunto set my hand this 3d day of July, A. D. 1891.

WALTER M. HARRIS.

Witnesses:
G. W. BEECHAM,
B. M. WILCOX.